United States Patent [19]
Bjerknes

[11] 3,843,271
[45] Oct. 22, 1974

[54] VERTICALLY ADJUSTABLE COLUMN, PARTICULARLY FOR CHAIRS AND THE LIKE

[75] Inventor: Anders Bjerknes, Oslo, Norway

[73] Assignee: Staal & Stil A/S, Sandvika, Norway

[22] Filed: Mar. 9, 1973

[21] Appl. No.: 339,601

[30] Foreign Application Priority Data
Apr. 12, 1972 Norway................................ 1244/72

[52] U.S. Cl. ................................. 403/104, 248/412
[51] Int. Cl. ......................... F16b 7/10, E04g 25/08
[58] Field of Search........................... 248/337, 412; 403/104–109

[56] References Cited
UNITED STATES PATENTS

| 258,038 | 5/1882 | Evarts................................. 403/104 |
| 2,275,330 | 3/1942 | Tveten............................ 403/104 X |
| 2,694,542 | 11/1954 | Barbakoff....................... 403/104 X |
| 2,947,556 | 8/1960 | Wenger............................ 403/104 X |

Primary Examiner—Geo. V. Larkin
Attorney, Agent, or Firm—Waters, Roditi, Schwartz & Nissen

[57] ABSTRACT

A telescopically adjustable column for chairs and the like, including inner and outer telescopic tubes defining an annular space between the outer surface of the inner tube and the inner surface of the outer tube, an internal locking device comprising a clamping member with a sleeve slidably positioned in the annular space and an actuating member connected to the inner tube and acting on the clamping member, and a release device comprising an externally actuable release rod connected to the clamping member. The sleeve is provided with at least one wedge-shaped recess and the actuating member consists of a corresponding wedge located on the outer surface of the inner tube and having inclined surfaces corresponding to the surfaces of the recess in the sleeve, the release rod being coupled to the sleeve by a pin extending through axial slots in the wall of the inner tube.

5 Claims, 3 Drawing Figures

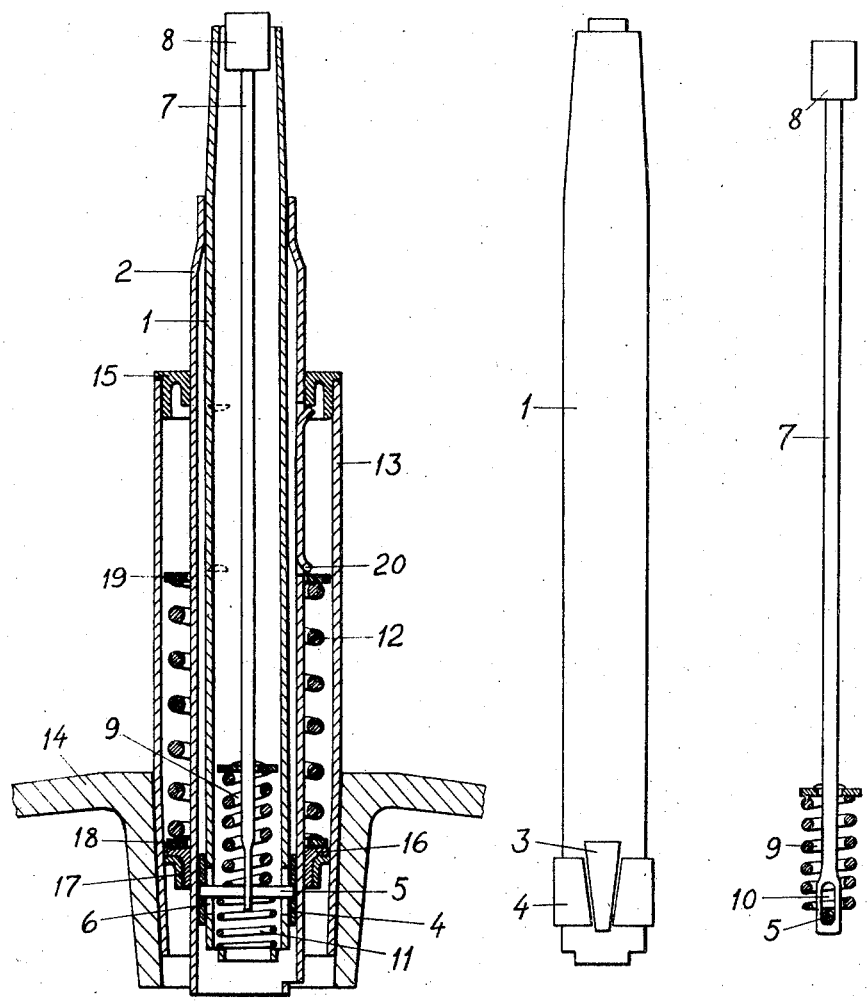

VERTICALLY ADJUSTABLE COLUMN, PARTICULARLY FOR CHAIRS AND THE LIKE

The present invention relates to a vertically adjustable column, particularly for chairs and the like, comprising inner and an outer telescopic tubes with a locking device for locking relative movement of the tubes and a device for release of the locking device, wherein the locking device comprises a clamping member positioned between the tubes and an actuating member connected to the inner tube and adapted to move the clamping member to locking engagement with the outer tube, and the release device comprises a release rod connected to the clamping member and adapted to eliminate the locking effect by an external action.

There are known different types of locking and release devices for such height adjustment means. One known locking device is in the form of a downwardly tapering cone or truncated cone which is disposed inside a cylindrical tube, and wherein the movement of the cone relative to the tube is prevented by means of balls which when the cone is subjected to a downwardly directed pressure, are pressed into frictional contact against the inner wall of the outer tube.

An object of the invention is to provide a height adjustment means which is simple and relatively cheap to produce, which is continuously adjustable and is reliable and safe during operation as it is not releasable when subjected to a load.

Such a device of the type which is referred to above, is according to the invention characterized in that the clamping member comprises a sleeve which is slidably positioned on the inner tube and has at least one wedge-shaped slot extending in the longitudinal direction of the tube, the actuating member comprising at least one wedge on the inner tube and having key surfaces corresponding to the respective slot, the release rod being coupled to the sleeve by means of a pin which is passed through axial slots in the wall of the inner tube.

An embodiment of the invention will now be described by way of example with reference to the accompanying drawings in which, FIG. 1 shows a partly sectioned height adjustment means according to the invention, FIG. 2 is a side view of the inner tube of the device with an associated wedge and a locking sleeve disposed thereon, and FIG. 3 is a partly sectioned side view of the release rod of the device with a safety spring and a release pin.

Referring to FIG. 1 the height adjustable device comprises a pair of telescopically mounted tubes 1 and 2 wherein inner tube 1 has a slighty smaller outer diameter than the inner diameter of outer tube 2, so that between the two tubes there is provided an annular space. The outer tube 2 is somewhat constricted at its upper end, so that at this portion there is a minimum clearance between the two tubes.

As shown in FIG. 2, the inner tube 1 carries, at its lower end, a downwardly tapering wedge 3 which may suitably be pressed out integrally with the tube, so that the outer surface of the wedge is parallel to the surface of the tube. The angle of the wedge may suitably be approximately 10°. In the space between the two tubes and surrounding the tube 1 at the level of the wedge 3 there is disposed a split sleeve 4, e.g., made of brass, where the cut-away part of the sleeve defines a slot which corresponds to the form of the wedge 3, as shown in FIG. 2. The thickness of the wall of the sleeve 4 essentially corresponds to the difference between the inner radius of the tube 2 and the outer radius of the tube 1. Thus, when the wedge 3 is not forceably pressed into the split in the sleeve 4, there will only exist a rather small frictional force between the sleeve 4 and the inner wall of the tube 2. When the inner tube 1 is subjected to a downwardly directed force or load, and the wedge 3 is pressed into the slot of the sleeve 4, the sleeve expands in an outward direction and comes into powerful frictional engagement with the outer tube 2. Thus, relative movement between tube 1 and tube 2 is prevented.

According to the invention, the release device comprises a release pin 5 which is fixed to the sleeve 4 and which may be acted upon from the outside for release of the locking device by moving the sleeve 4 out of engagement with the wedge 3. As shown in FIG. 1, the pin 5 is passed through axially extending and diametrically opposed slots 6 in the inner wall of the tube 1. The ends of the pin 5 are loosely disposed in corresponding holes provided diametrically in the sleeve 4. The release pin 5 is connected to a release rod 7 which is disposed inside the inner tube 1 and which extends upwards to a guide plug 8 at the upper end of the tube. When the device is used for the adjustment of the height of the seat of a chair, there will be provided an operating lever or handle which acts on the guide plug 8, so that the release rod 7 may be pressed downwards for the release of the locking device.

In order to secure the adjustment device against unwanted or unintended release, and in order to make it unreleaseable during load, the release rod is provided with a helical spring 9 by which an elastically yielding transmission of the release force is imparted to the release pin 5. As shown in FIG. 3, the release pin is introduced through an axial slot 10 in the lower end of the release rod 7, and in the position shown in the Figure, the release pin is pressed against the lower end of slot 10 by the spring 9. Thus, a downwardly directed force on the release rod 7 is transmitted to the release pin 5 by way of the spring 9. This will always be the case since the release rod 7 can be moved downwards only a limited distance, and the length of the slot 10 is made larger than this distance. Thus, by unintended shocks or impacts there will not take place any unwanted release of the locking device. Further, a release of the locking device during load (i.e. by means of a large downwardly directed force on the inner tube 1) will not be possible, because the spring 9 is dimensioned such that it is not strong enough for moving the release pin 5 and the sleeve 4 which is then pressed strongly against the inner wall of the outer tube 2 by the wedge 3.

In order to insure contact between the wedge 3 on the inner tube 1 and the locking sleeve 4 when the locking device is released, a position spring 11 is placed in the inner tube beneath the release pin 5, said spring bearing against the lower end of tube 1 and urging the release pin 5 upwardly and thereby the locking sleeve 4 upwards against the wedge 3.

The elastic force of the spring 11 has the effect that the wedge 3 presses the sleeve 4 somewhat outwards against the inner wall of the outer tube 2, so that an accurate locking of the adjustment device is obtained at the desired height, without the sleeve 4 and therewith the inner tube 1 sliding downwards due to insufficient friction between the sleeve and the inner wall of the outer tube 2.

In the above described embodiment there is used one single wedge in the locking device, which wedge cooperates with a corresponding slot in the locking sleeve. There may, however, also be utilized other sleeve embodiments with correspondingly formed wedge means. There may be used a two-piece sleeve with two corresponding wedges which may be arranged at diametrically opposed locations on the inner tube 1.

In FIG. 1 there are shown a number of additional details which are commonly found, for example, on swivel chairs, but which are not part of the invention. Thus, the height adjustment device is resiliently mounted by means of a so-called buffer spring 12 disposed in a spring casing 13 which in turn is rotatably mounted in a lower base portion 14. The guide tube 2 is slidable in a top bushing 15 and a bottom bushing 16 such as an acetate bushing. The bushing 16 is supported by a supporting ring 17, which may be made of steel, and above the bushing there is placed a steel ring 18 for the support of the buffer spring 12. On top of the buffer spring 12 there is placed another steel ring 19 which is held in place by means of outer lugs 20 on the outer tube 2.

We claim:

1. A telescopically adjustable column for chairs and the like, comprising inner and outer telescopic tubes defining an annular space therebetween, an internal locking device including an expandible clamping member slidably positioned in said annular space, and an actuating member connected to said inner tube and acting on said clamping member to expand the same in a locking position and cause the clamping member to strongly frictionally engage the outer tube, and a release device comprising an externally actuable release rod connected to said clamping member to move the same in a direction in which the actuating member releases the clamping member to reduce its frictional engagement with the outer tube, said clamping member having at least one wedge-shaped slot therein extending in the longitudinal direction of said tubes, said actuating member comprising at least one wedge located on said inner tube on the outer surface thereof and having key surfaces corresponding to said slot in the clamping member, and a pin connecting the release rod to said clamping member, said pin extending through axial slots provided in the wall of said inner tube.

2. A telescopically adjustable column as claimed in claim 1 wherein said clamping member comprises a sleeve.

3. A telescopically adjustable column as claimed in claim 1, comprising a spring coupled between said release rod and said pin.

4. A telescopically adjustable column as claimed in claim 1, comprising a position spring supported by said inner tube and acting on said pin.

5. A telescopically adjustable column as claimed in claim 4 wherein said position spring is disposed within said inner tube.

* * * * *